Nov. 2, 1948.    F. COLLURA    2,452,907
MAGAZINE PENCIL OF THE PUSH-BUTTON TYPE
Filed July 1, 1946    5 Sheets-Sheet 1
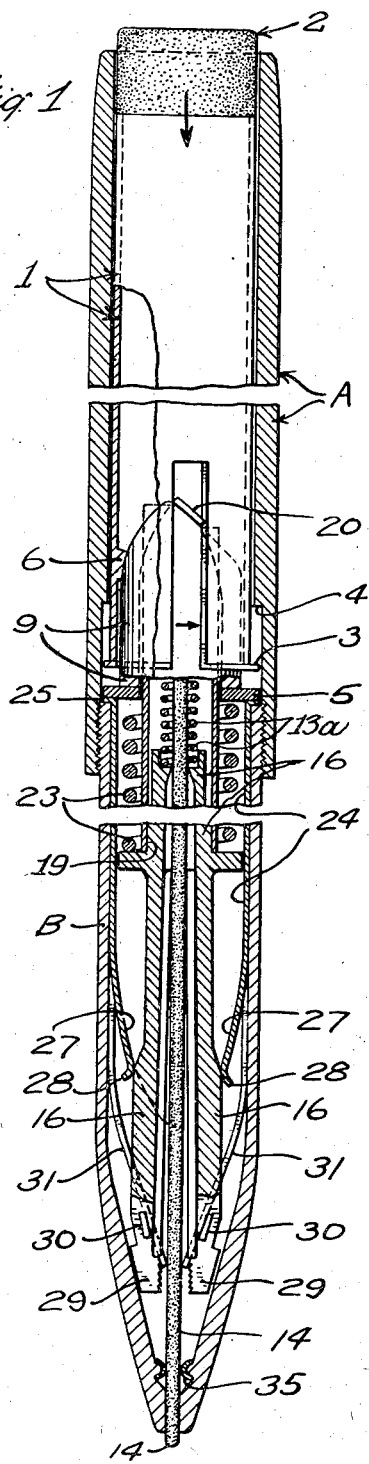
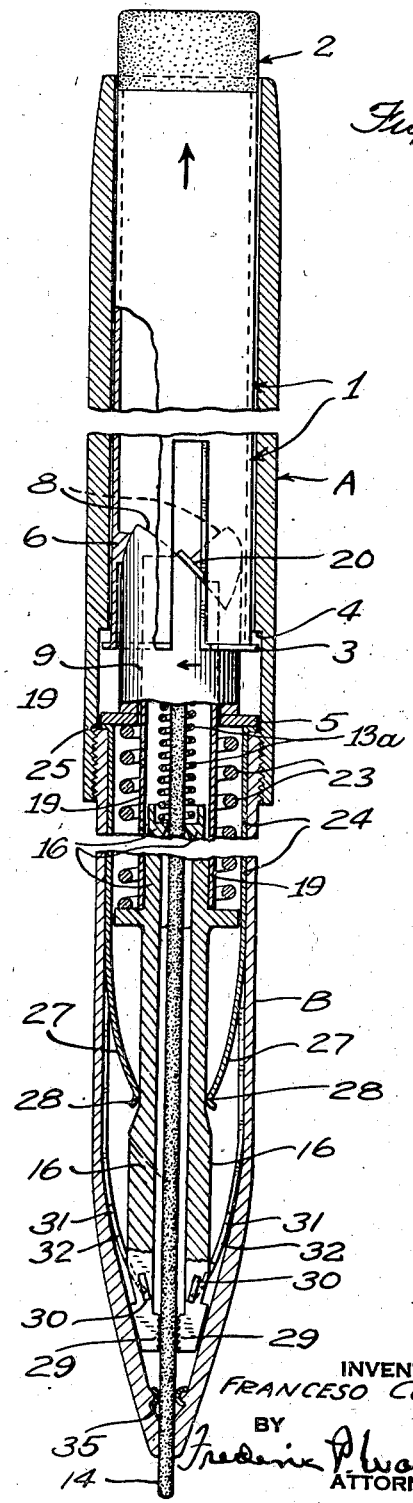
INVENTOR
FRANCESO COLLURA
BY
ATTORNEY

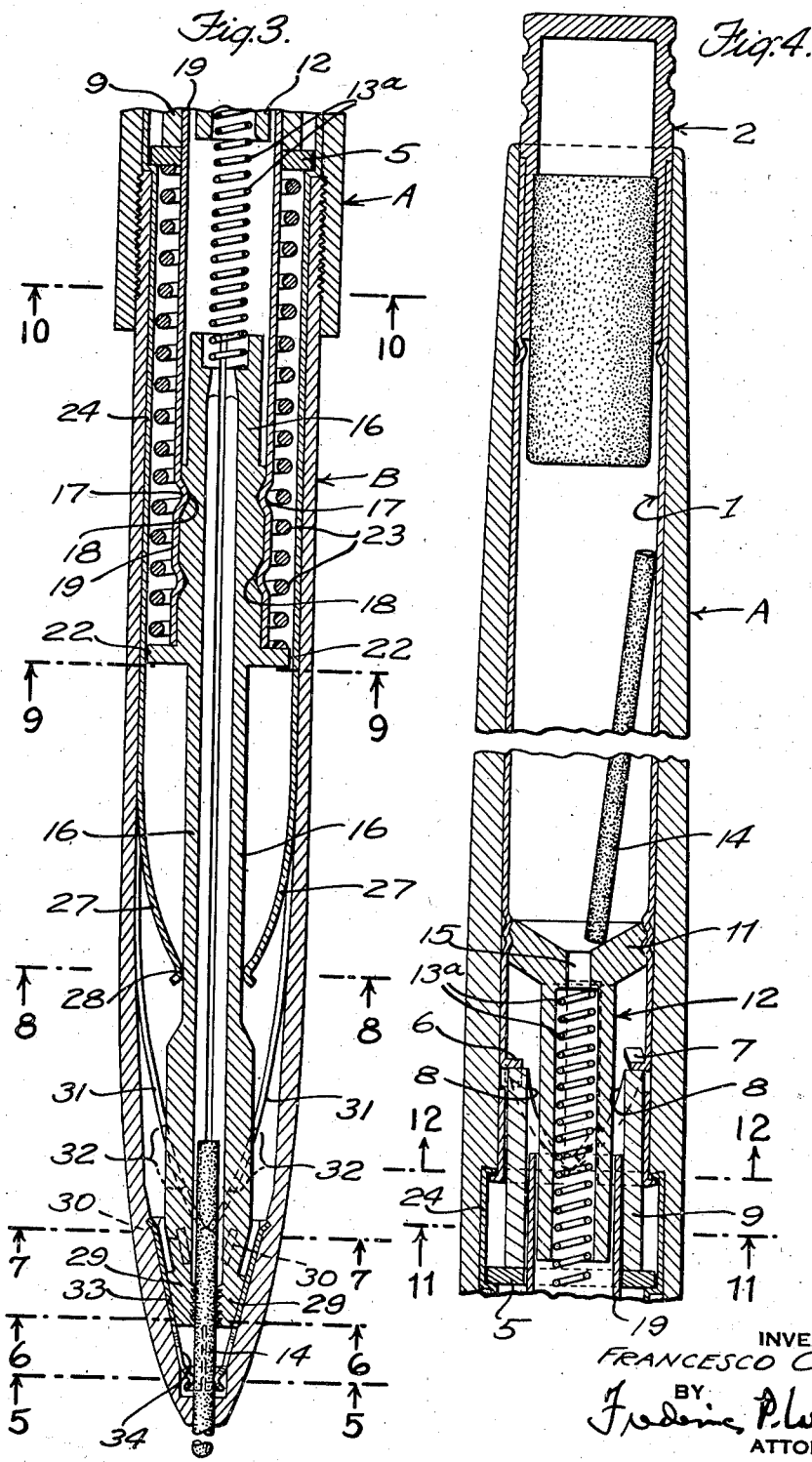

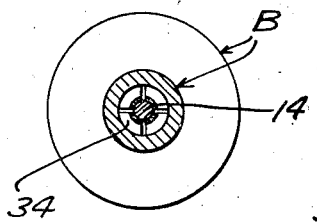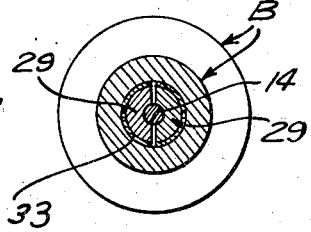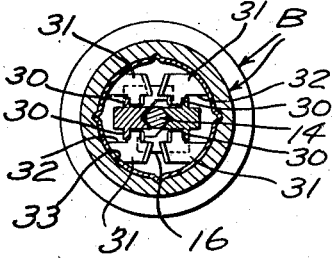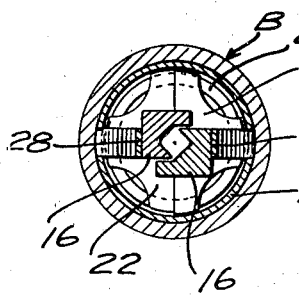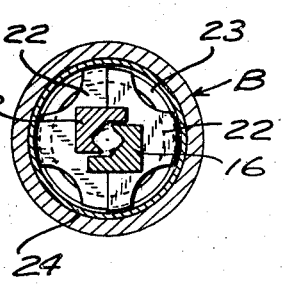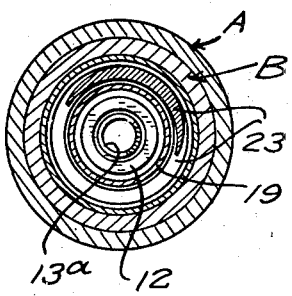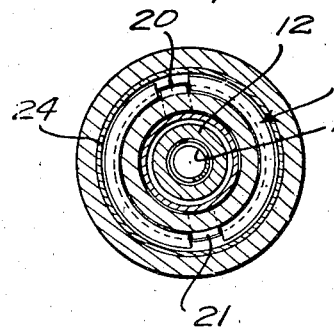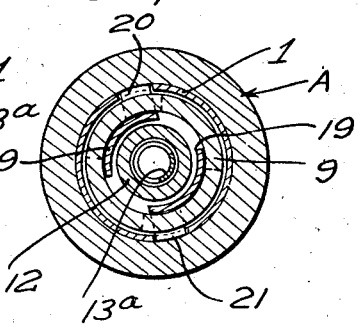

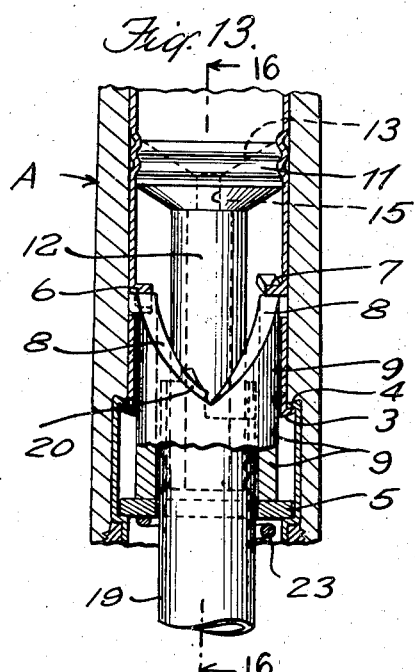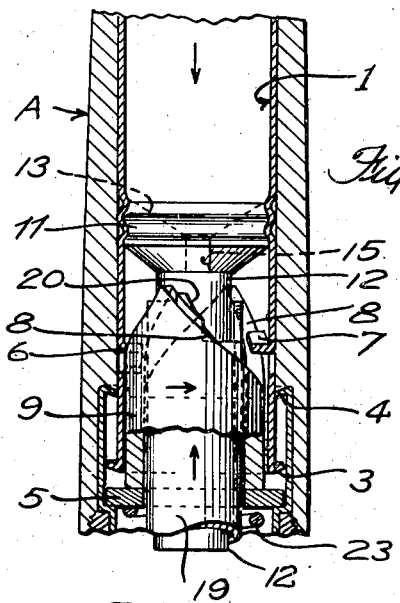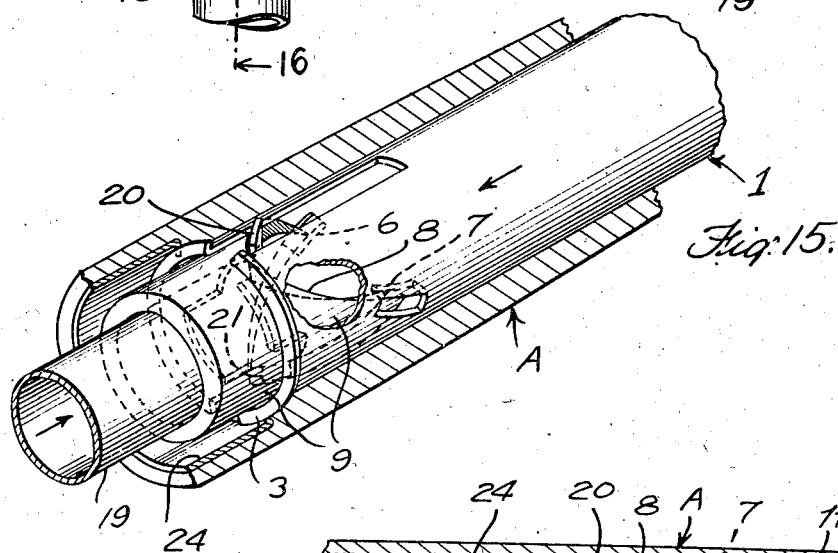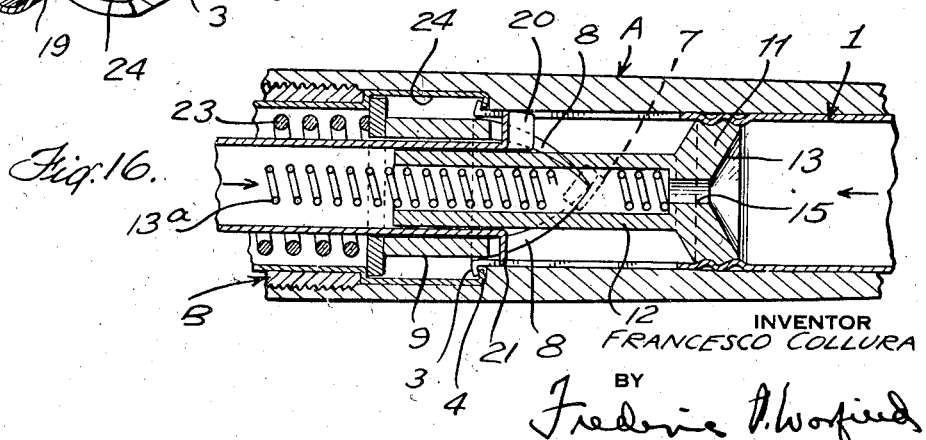
INVENTOR
FRANCESCO COLLURA
BY
Frederic P. Worfield Nov. 2, 1948.    F. COLLURA    2,452,907
MAGAZINE PENCIL OF THE PUSH-BUTTON TYPE
Filed July 1, 1946    5 Sheets-Sheet 5
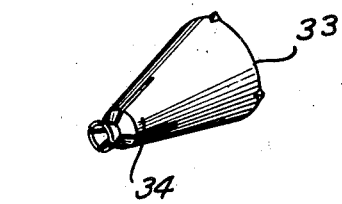
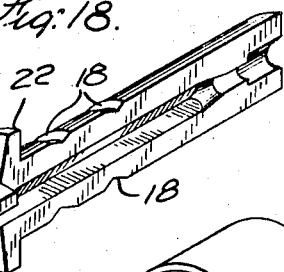
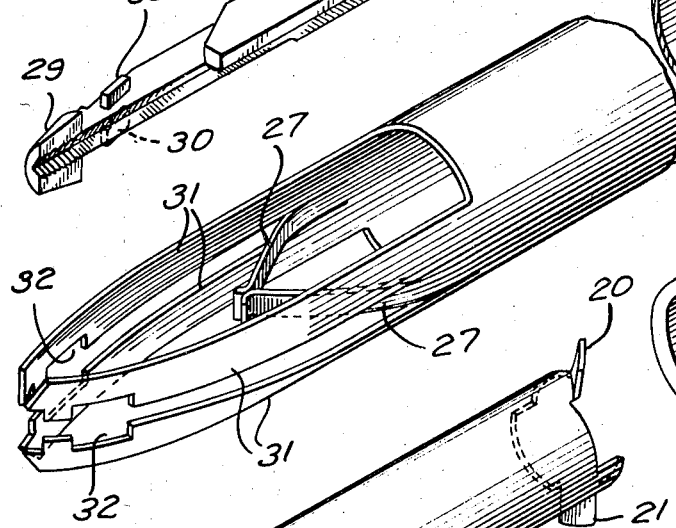
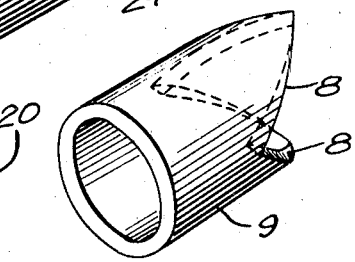
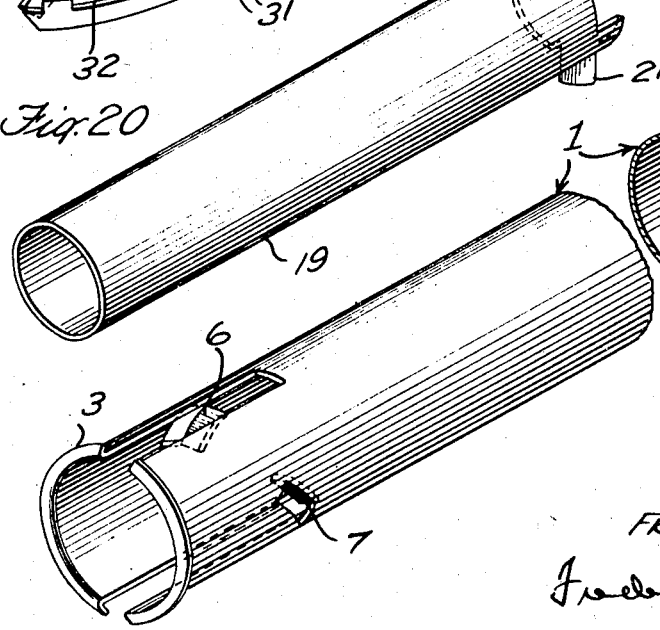
INVENTOR
FRANCESCO COLLURA
BY
Frederic P. Worfield
ATTORNEY Patented Nov. 2, 1948

2,452,907

UNITED STATES PATENT OFFICE 2,452,907

MAGAZINE PENCIL OF THE PUSH-BUTTON TYPE

Francesco Collura, New York, N. Y.

Application July 1, 1946, Serial No. 680,577

7 Claims. (Cl. 120—17)

1

This invention relates to magazine pencils of the push button type and its object is to make a simpler, more efficient, and more durable pencil.

Other objects of the invention will in part be obvious and will in part appear hereinafter.

The invention accordingly comprises an article of manufacture possessing the features, properties, and the relation of elements which will be exemplified in the article hereinafter described, and the scope of the application of which will be indicated in the claims.

For a fuller understanding of the nature and objects of the invention reference should be had to the following detailed description taken in connection with the accompanying drawings, in which:

Fig. 1 is a sectional view of the pencil on an enlarged scale broken in length at two places, showing some of the parts in simplified form, in the position in which they appear as the actuating push button is depressed by the finger or thumb of the operator and just before the limit of downward movement of this push button and parts associated therewith is reached;

Fig. 2 is a similar view showing the next succeeding position of the parts as pressure is relieved from the push button and the operating spring, upon release of push button pressure, carries the feed jaws and the lead down and out of the tip;

Fig. 3 is a sectional view on an enlarged scale with all details supplied showing the final position which the feed jaws assume with the pencil in writing position;

Fig. 4 is a section of the upper end of the pencil showing the parts in position corresponding to that of Fig. 3;

Fig. 5 is a sectional view on the line 5—5 of Fig. 3;

Fig. 6 is a sectional view on the line 6—6 of Fig. 3;

Fig. 7 is a sectional view on the line 7—7 of Fig. 3;

Fig. 8 is a sectional view on the line 8—8 of Fig. 3;

Fig. 9 is a sectional view on the line 9—9 of Fig. 3;

Fig. 10 is a sectional view on the line 10—10 of Fig. 3;

Fig. 11 is a sectional view on the line 11—11 of Fig. 4;

Fig. 12 is a sectional view on the line 12—12 of Fig. 4;

Fig. 13 is a sectional detail view showing certain of the operating parts in the central part of the pencil just below the lower end of the magazine and with the parts in writing position with the push button as in Fig. 4;

Fig. 14 is a view similar to Fig. 13 but with the parts in the position which they show when the push button and the parts associated therewith have been depressed until they approach the lower limit of their movement;

Fig. 15 is a detail perspective partly in section of the parts shown in Fig. 13;

Fig. 16 is a detail in section of certain parts at the center of the pencil shown as in writing position of Fig. 4;

Fig. 17 shows the spring clip carried within the lower end of the pencil casing which puts a light spring restraint upon the lead at all times and prevents its falling out when the grip of the feed jaws is released;

Fig. 18 is a perspective detail of one of the two feed jaw members;

Fig. 19 is a perspective, broken through, of the tubular member fixed within the casing, carrying at its lower end spring arms cooperating with the feed jaw members of Fig. 18 as shown in the assembly of Figs. 1, 2 and 3;

Fig. 20 is a detail perspective of one of the operating members which is raised with the feed jaw members associated therewith upon the depression of the push button;

Fig. 21 is a perspective detail of a member having cam surfaces at its upper end which when turned by the downward thrust of the push button raises the member shown in Fig. 20 with its connected feed jaw members; and Fig. 22 is a detail perspective of the magazine cylinder carried with the push button in its downward travel and causing the operation of the parts shown in Figs. 20 and 21.

The pencil as shown has an upper casing section A and a lower casing section B screwed together somewhat below midsection of the pencil. A cylindrical magazine 1 carries with it push button 2 and is mounted for reciprocable movement within the upper casing section A to an extent limited by the flange 3 which travels between shoulder 4 on the inner face of casing A and washer 5 carried within the casing A and B. Pressed in from the magazine cylinder 1 are two cam stud members 6 and 7 on opposite sides thereof which on the downward movement of the magazine cylinder 1 ride upon the cam faces 8, 8 carried at the upper end of sleeve 9 shown in detail in Fig. 21 and resting freely at its lower end upon the washer 5.

The bottom of the cylindrical magazine 1 shown in Fig. 4 is formed by the crimped flange 11' carried at the upper end of tubular member 12. This bottom of the magazine is beveled at 13 to facilitate movement of lead sticks 14 to the central opening 15 through which they pass in the operation of the pencil down to and out of the tip. Within tubular member 12 is a light spiral spring 13a, shown in Figs. 3, 4 and 16, which acts as a continuation of the lead tube from the opening 15 down to the point where the lead sticks 14 pass into the upper end of the lead tube formed by the feed jaw members 16, 16, shown in Figs. 1, 2, 3 and 18, which provide a continuous protection for the lead sticks down toward the tip of the pencil casing. The section of the lead tube provided by the spiral spring 13a could be filled by telescoping tube members but the spring form shown is preferred from the standpoint of ease of operation and less likelihood of getting out of order and causing injury to the fragile lead. Connected to the upper end of the feed jaws as by rib and groove connection at 17 and 18 as shown in Fig. 3 is the tubular member 19 of Fig. 20 carrying at its upper end cam wings 20, 21, which cooperate with the cam surfaces 8, 8 on member 9 to raise the tube 19, and with it the feed jaws 16, as cam sleeve 9 is rotated about the central axis of the pencil upon the depression of the push button 2.

Between washer 5 and projecting flanges 22 carried by the feed jaw members 16 is the main operating coil spring 23. Tubular member 24 is carried in fixed position in the lower section B of the pencil casing. It carries flange 25 at its upper end which rests upon the upper end of the casing B and is held thereto by the washer 10, which in turn is held in position by the cam sleeve 9. This tubular member 24 carries arms struck inwardly at 26, 26 which imposes a light spring pressure due to the material of which they are formed upon the feed jaw members 16 at the points 28, 28. These feed jaw members 16 are of material such that they have a natural elastic tension toward their lower ends and carry at their lower ends the feed jaws 29, 29 which in normal writing position, as in Fig. 3, grip the lowermost lead stick 14 and hold it lightly but firmly in place. Each feed jaw member carries a cam stud 30 which cooperates with the lower arms 31, 31, carried by the tube 26 so that when the feed jaw members are drawn upwardly as in Fig. 1 these cams 30 pass outside the lower ends of the arms 31 and the feed jaws are forced apart. This continues until cams 30 reach the cut out portions 32 in the arms 31 when the feed jaw members, due to their own resiliency and also to the pressure of the spring arms 27, will move back into position against the lead and the parts then assume the position shown in Fig. 2. Further sequence of operations carries the feed jaws down with the lead and to the final writing position of Fig. 3.

The operation of this pencil mechanism should now be clear. The depression of the push button carries with it the magazine cylinder 1, and the cam projections 6 and 7 from such cylinder, riding on the cam faces of the cam sleeve 9, will rotate the cam member about a central axis, and this rotation acting upon the cam wings 20 and 21 upon the upper end of tube 19 will raise the tube and with it the feed jaw members connected thereto. In rising, the feed jaws are carried out of contact with the lowermost lead by contact between the cam studs 30 and the lower end of members 31, and this upward movement of the feed jaws continues until the studs 30 snap through the openings 32 in the members 31 and the feed jaws return to contact with the lead at a point above their original gripping point. Then when the operator releases the pressure upon the push button the spring 23 which has been compressed by the raising of the feed jaw members comes into operation to feed these jaw members downwardly and feed the lead out of the tip of the pencil for any desired and predetermined extent.

In order to insure constant light spring pressure upon the lead stick in the lower end of the pencil, the conical spring sleeve 33 shown in detail in Fig. 17 is fitted fixedly into the lower end of the casing section B and has lower spring arms 34 which by virtue of their inherent elasticity supply constant light pressure upon the lead at the lower end of the pencil without undue interference with the downward passage of the lead stick when it is fed to a new position. The simplified diagrammatic form of Figs. 1 and 2 indicate only the lower end of this pressure device.

It will thus be seen that the downward feed of the lead is not directly caused by the action of the push button which, due to the irregular action of the fingers of the operator or otherwise, may cause breakage of the lead and imperfect operation of the pencil. The downward action of the push button raises the feed jaws, brings them to a desired upper postion along the lead and the downward feed of the lead is caused by the action of the spring which may be a comparatively light spring and the pencil, accordingly, does not have the disadvantages of a downward feed due directly to the action of the push button as in many commercial pencils known in the art.

Since certain changes may be made in the above article and different embodiments of the invention could be made without departing from the scope of the claims, it is intended that all matter contained in the above description or shown in the accompanying drawing shall be interpreted as illustrative and not in a limiting sense.

It is also to be understood that the following claims are intended to cover all of the generic and specific features of the invention herein described, and all statements of the scope of the invention which as a matter of language might be said to fall therebetween.

Having described my invention, what I claim as new and desire to secure by Letters Patent is:

1. In combination, a pencil casing, a reciprocable push button within the upper end thereof, lead feed jaws within the casing, a connection between said push button and said feed jaws embodying a spring, such connection comprising means whereby, upon depression of the push button, the feed jaws are raised to a higher point within the casing, this movement also acting to compress the spring, which spring upon release of the push button pressure will return the lead feed jaws to a position toward the pencil tip.

2. In combination, a pencil casing, a reciprocable push button within the upper end thereof, lead feed jaws within the casing, a connection between said push button and said feed jaws embodying a spring, such connection comprising means whereby, upon depression of the push button, the feed jaws are moved apart from each other and raised to a higher point within the casing, and allowed again to move toward each other, this movement also acting to compress the spring, which spring upon release of the push button pressure will return the lead feed jaws to a position toward the pencil tip.

3. In combination, a pencil casing, a reciprocable push button within the upper end thereof, lead feed jaws within the casing, a cam member within the casing, a connection between said feed jaws and said cam member acting to raise said feed jaws within the casing upon movement of said cam member, a connection between said push button and said cam member whereby upon depression of said push button said cam member is moved to raise the feed jaws, and a spring carried with said feed jaws and compressed upon the upward movement thereof.

4. In combination, a pencil casing, a magazine cylinder carried at the upper end thereof and reciprocable therein, a push button carried by said magazine cylinder, feed jaw members, and a spring control connection between said magazine and said feed jaw members such that upon depression of said magazine cylinder the feed jaws are relieved from contact with the lead, raised to a higher point on the lead, thereupon brought again into contact with the lead and the feeding action of the lead through the tip of the pencil thereupon performed by the action of the control spring.

5. In combination, a pencil casing, a magazine cylinder carried at the upper end thereof and reciprocable therein, a push button carried by said magazine cylinder, feed jaw members, and a spring controlled cam connection between said magazine and said feed jaw members such that upon depression of said magazine cylinder the feed jaws are relieved from contact with the lead, raised to a higher point on the lead, thereupon brought again into contact with the lead and the feeding action of the lead through the tip of the pencil thereupon performed by the action of the control spring.

6. In combination, a pencil casing, a magazine cylinder carried at the upper end thereof and reciprocable therein, a push button carried by said magazine cylinder, feed jaw members located in the lower part of the pencil casing, and a spring control connection between said magazine and said feed jaw members such that upon depression of said magazine cylinder the feed jaws are relieved from contact with the lead, raised to a higher point on the lead, thereupon brought again into contact with the lead and the feeding action of the lead through the tip of the pencil thereupon performed by the action of the control spring.

7. In combination, a pencil casing, a magazine cylinder carried at the upper end thereof and reciprocable therein, a push button carried with said magazine cylinder, feed jaw members within said casing, a rotatable sleeve within said casing carrying a cam surface angularly disposed with reference to the vertical line of said casing, a part carried by said magazine cylinder contacting said cam surface to rotate the said sleeve, a cam part carried with said feed jaws cooperating with the cam surface of said sleeve whereby upon depression of said push button said feed jaws are raised within the casing, a spring carried with said feed jaws and compressed upon the upward movement thereof within the casing, whereby the feed jaws will be returned to their initial position by the action of the spring, upon release of pressure upon said push button.

FRANCESCO COLLURA.

REFERENCES CITED

The following references are of record in the file of this patent:

UNITED STATES PATENTS

| Number | Name | Date |
|---|---|---|
| 253,803 | Wittman | Feb. 14, 1882 |
| 2,056,143 | Robbins | Sept. 29, 1936 |